United States Patent [19]

Grosso

[11] 3,962,290

[45] June 8, 1976

[54] PROCESS FOR N,N,N',N'-TETRAARYLQUINONE DIIMONIUM SALTS

[75] Inventor: Vincent Gerard Grosso, Piscataway, N.J.

[73] Assignee: American Cyanamid Company, Stamford, Conn.

[22] Filed: Feb. 25, 1974

[21] Appl. No.: 445,510

[52] U.S. Cl. .............................. 260/396 N
[51] Int. Cl.² ........................... C07C 119/14
[58] Field of Search .................. 260/396 N

[56] References Cited
UNITED STATES PATENTS 3,637,769    1/1972    Susi .......................... 260/396

Primary Examiner—Lorraine A. Weinberger
Assistant Examiner—Jane S. Myers
Attorney, Agent, or Firm—John L. Sullivan

[57] ABSTRACT

N,N,N',N'-tetraarylquinone diimonium salt infrared absorbers of improved heat stability are prepared by oxidizing an N,N,N',N'-tetraarylquinonediamine with a cupric salt, such as cupric chloride or cupric nitrate, rather than a silver salt as heretofore.

4 Claims, No Drawings

PROCESS FOR N,N,N',N'-TETRAARYLQUINONE DIIMONIUM SALTS

This invention relates to an improved method for the preparation of heat-stable N,N,N',N'-tetraarylquinone diimonium salts useful as infrared absorbers for plastic substrates.

The class of diimonium salts to which the improved method of the invention applies are well known, being disclosed and claimed in U.S. Pat. No. 3,637,769, issued Jan. 25, 1972, to Peter Vincent Susi, the entire disclosure of which is incorporated herein by reference.

As shown in U.S. Pat. No. 3,637,769, the diimonium salts are represented by the following formula:

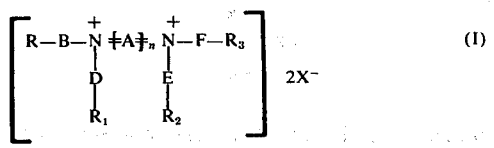

wherein A, B, D, E and F represent benzene or naphthalene radicals; n is 1 or 2; R, $R_1$, $R_2$ and $R_3$ represent hydrogen, alkyl, alkoxy, alkenyl, aralkyl, aryl, alkaryl, acyl or

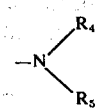

radicals, said $R_4$ and $R_5$ in turn representing hydrogen, alkyl, alkenyl, aralkyl, aryl alkaryl or acetyl radicals; said A, B, D, E and F and R through $R_5$ which are other than hydrogen being either unsubstituted or substituted with inert groups such as lower alkyl, lower alkoxy, hydroxy, cyano, carboxy, sulfo, halogen and the like; and $X^-$ represents an anion.

The diimonium salts of Formula I are derived from N,N'-substituted diamino compounds of the formula:

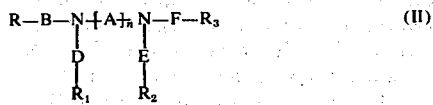

wherein A, B, D, E and F and R through $R_5$ have the same meaning as in Formula I, by the oxidation of the two tertiary nitrogen atoms thereof to form the diimonium cation.

As further shown in U.S. Pat. No. 3,637,969, the oxidation of the precursor diamino compounds to produce the diimonium compounds was effected usng a silver salt catalyst in an organic solvent in accordance with the method of Neunhoeffer et al, Ber. 92, 245 (1959). Thus, the precursor amines were oxidized using a range of silver salts, the most advantageous of which, in terms of the stability of the diimonium salt product, were silver hexafluoroantimonate and silver hexafluoroarsenate. Nevertheless, the stability of all of the infrared absorber salt products was significantly affected by heat, such as that encountered in incorporating the absorber compounds into the plastic. This instability is reflected in a loss of absorption at the wavelength of maximum absorption for the particular compound. The loss in stability of the compounds has been traced to the presence of free colloidal silver, which is difficult to remove from the product compounds. Thus, the presence of the colloidal silver has been found to reduce the absorption of the compounds on exposure to heat by as much as 20–25%. Obviously, such losses in absorption reduce the effectiveness of the compounds as infrared absorbers.

Accordingly, it is the object of the present invention to provide a method for the oxidation of the precursor diamines whereby diimonium salt infrared absorbers of improved heat stability are produced. This object has been accomplished by the present invention.

Thus, in accordance with the invention, it has now been found that infrared absorber diimonium salt having substantially improved heat stability are obtained if the oxidation of the precursor amines is conducted in the presence of a cupric salt rather than a silver salt, as heretofore, the oxidation being effected in an organic solvent.

Any cupric salt which is soluble to an appreciable extent in the organic solvent may be used in the oxidation reaction. Useful cupric salts are, for example, cupric chloride, cupric nitrate, cupric bromide, cupric sulfate and cupric acetate with cupric chloride and cupric nitrate being particularly preferred.

The solvent used is not particularly critical provided it is inert to the reactants and the product salts under the reaction conditions. Acetone is a preferred solvent due to its ease of handling. However, other solvents, such as dimethylformamide and dimethylacetamide, give equally good results.

The amount of the cupric salt used in oxidation reaction is two mole proportions per mole proportion of the N,N,N',N'-tetraarylarylenediamine.

The reaction temperatures used in the oxidation are not critical. Ordinarily, temperatures from about room temperature (20°–30°C.) to about 50°C., are used. When acetone is used as the solvent, the reaction is conveniently carried out a 40°–50°C.

Generally, following completion of the oxidation, insoluble inorganic salts are filtered off and the product isolated from solution by cooling or by precipitation from solution with water. The solid product is then filtered off, washed free of solvent and residual salts and dried, according to standard techniques.

Although the diimonium salt infrared absorber compounds may be used in the form of the anion provided by the cupric salt, it is preferred that the product compounds be in the form of hexafluoroantimonate or hexafluoroarsenate salts, preferably the hexafluoroantimonate salts. The latter types of salts are readily obtained by utilizing in conjunction with the cupric salt a hexafluoroantimonate or hexafluoroarsenate salt which is soluble in the oxidation reaction solvent, such as the sodium salt, in an amount sufficient to replace the cupric salt anion in the diimonium salt product with the hexafluoroantimonate or hexafluoroarsenate ion, said amount being 2 mol proportions of said soluble salt per mol proportion of cupric salt used in the oxidation. The soluble salt, the curpic salt and the diamine may be added to the reaction solvent in any order to provide the hexafluoroantimonate or hexafluoroarsenate diimonium salt.

The following preparational example and tests will serve to illustrate the invention.

EXAMPLE 1

Preparation of N,N,N',N'-Tetrakis(p-dibutylaminophenyl)-p-benzoquinonebis (imonium hexafluoroantimonate)

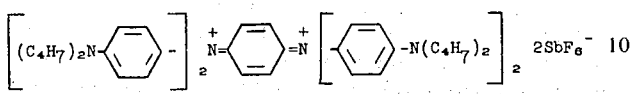

(A) A stirred solution of 4.6 grams (0.005 mols) of tetrakis(p-dibutylaminophenyl)-p-phenylene diamine in 100 ml. acetone was heated to 40°–45°C. and treated with 2.4 grams (0.01 mols) of cupric nitrate, Cu(NO$_3$)$_2$·3H$_2$O, for one hour after which 5.17 grams (0.02 mols) of sodium hexafluoroantimonate was added and the whole stirred for an additional 30 minutes. The mixture was then filtered, drowned in 40 ml. water and the solid product filtered off, washed with water and dried. The product was labeled Product A.

B. The procedure of A, above, was repeated except that silver nitrate was used in place of the copper nitrate (the mol proportions of all three reactants being the same as in A). This product was labeled Product B.

Heat Stability Test

As indicated hereinabove, the stability of the diimonium salt infrared absorber compounds is adversely affected by exposure to heat, such as encountered in the processing of plastics containing them, such as a monomer casting, injection molding, extruding, etc. The loss in stability thus incurred by the compounds is reflected by a loss in their absorption at the wavelength of maximum absorption for the individual compound. Accordingly, the following test procedure affords a measure of the heat stability of the absorber compounds.

A film-casting solution is prepared by dissolving 20 mg. of the absorber compound, 10 g. of polyvinyl chloride (VYNW-5, Union Carbide) and 2 g. of dioctylphthalate (plasticizer) in 100 ml. tetrahydrofuran. A portion of this solution is used to cast a 2.4–3.0 ml. film without heating. A second portion of the solution is placed in a sealed pressure bottle and heated for 1½ hours at 96°C., after which it is cooled and used to cast a second 2.4–3.0 mil. film. The spectra of each of the films is measured, any difference in the thickness of the two films compensated for, and the percent loss in absorption due to decomposition of the absorber compound by heat is calculated as a measure of the heat stability of the compound.

Products A and B, prepared in Example 1 above, were tested by the foregoing procedure. Compound A showed a loss in absorption of 4.2%, whereas Compound B showed a loss of 22%, thus showing the markedly greater than stability of Compound A, prepared by the cupric salt oxidation process of this invention over Compound B, prepared by the previously known silver salt oxidation.

I claim:

1. A process for oxidizing a diamine compound represented by the formula:

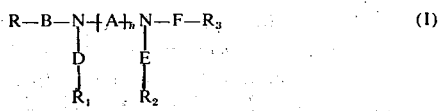

wherein A, B, D, E and F represent benzene or naphthalene radicals; n is 1 or 2 and R, R$_1$, R$_2$ and R$_3$ represent hydrogen, lower alkyl, lower alkoxy, phenyl, tolyl, acetyl, or

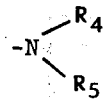

radicals, said R$_4$ and R$_5$ in turn representing hydrogen, alkyl of from 1 to 12 carbon atoms, benzyl, naphthylmethyl or trifluroracetyl radicals; said A, B, D, E and F and R through R$_5$ which are other than hydrogen being either unsubstituted or substituted with an inert group selected from lower alkyl, lower alkoxy, hydroxy, cyano, carboxy, sulfo and halogen; to produce a diimonium compound represented by the formula

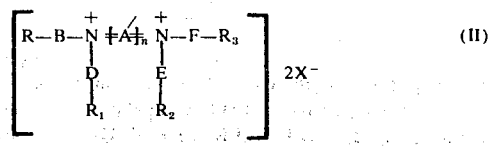

wherein $A'$ represents a benzoquinonoid or naphthoquinonoid radical and, B, D, E and F and R through R$_5$ have the same meaning as in formula I and X$^-$ represents a hexalfluoroantimonate or hexafluoroarsenate ion; which process commprises conducting the oxidation reaction in an inert organic solvent in the presence of about 2 mole proportions of a cupric salt per mole proportion of said diamine and 2 mole proportions of a soluble hexafloroantimonate or hexafluoroarsenate salt per mole proportion of said cupric salt, said cupric salt being soluble in said solvent.

2. A process according to claim 1 wherein the diamine compound is tetrakis(p-dibutylaminophenyl)-p-phenylene diamine, the soluble salt is sodium hexafluoroantimonate and the diimonium compound is N,N,N',N'-tetrakis(p-dibutylaminophenyl)-p-benzoquinonebis(imonium hexafloroantimonate).

3. A process according to claim 2 wherein the cupric salt is cupric chloride or cupric nitrate.

4. A process according to claim 3 wherein the organic solvent is acetone.

* * * * *